United States Patent [19]

Suter et al.

[11] Patent Number: 4,999,516
[45] Date of Patent: Mar. 12, 1991

[54] COMBINED BIAS SUPPLY POWER SHUT-OFF CIRCUIT

[75] Inventors: Richard R. Suter, Beaverton; Russell R. Moen, Jr., Tigard, both of Oreg.

[73] Assignee: AT&E Corporation, San Francisco, Calif.

[21] Appl. No.: 380,914

[22] Filed: Jul. 17, 1989

[51] Int. Cl.$^5$ ............................ H03K 3/01; H03K 5/13
[52] U.S. Cl. ............................ 307/296.3; 307/296.1; 307/592; 365/227
[58] Field of Search ............... 307/296.3, 296.6, 296.1, 307/592; 365/227

[56] References Cited
U.S. PATENT DOCUMENTS 4,323,881  4/1982  Mori .................................... 365/227
4,645,953  2/1987  Wong ................................ 307/296.3

Primary Examiner—Stanley D. Miller
Assistant Examiner—Richard Roseen
Attorney, Agent, or Firm—Elmer W. Galbi

[57] ABSTRACT

A microcircuit bias-current supply in a wristwatch-pager. An FM-radio receiver in a microcircuit paging device operates intermittently with a short on-time and long off-time to reduce power consumption and preserve battery life. Ths bias-supply circuit distributes predetermined bias currents to a plurality of functional circuit areas of the microcircuit die, the bias currents being disabled during off-time of the receiver such that the current drain of the entire microcircuit is virtually zero, being in the range of nanoamps. The inefficiencies and disadvantages of a series switch to switch power on and off are eliminated by providing a plurality of switched current sources which perform the dual function of circuit biasing and current switching.

18 Claims, 3 Drawing Sheets

COMBINED BIAS SUPPLY POWER SHUT-OFF CIRCUIT

FIELD OF THE INVENTION

The present invention relates to electronic circuitry and more particularly to power shut-off circuitry and to current bias circuitry.

BACKGROUND OF THE INVENTION

Electronic paging systems incorporating portable, battery operated paging receivers use various methods for reducing the power consumption of the receivers to minimize their overall size and to extend battery life. Many of the existinq systems supply power to the receiver circuits only during intermittent and/or predetermined time periods during which data for the receiver is transmitted. The problem of limiting power consumption and extending battery life is exacerbated in miniature radio receivers incorporated in a wristwatch-pager such as that described in U.S. Pat. No. 4,713,808 to Gaskill et al. The small size and portable nature of the wristband receiver, plus the large number of circuits used compared with the number used in a conventional electronic watch, make reduced power dissipation a primary consideration in the design of the wristwatch-pager.

In the system described in the Gaskill patent the duty cycle of the radio receiver is very short, hence, in order to extend battery life it is desirable that power dissipation in the receiver circuits be virtually zero during the relatively long periods when the receiver is inactive. Further, it is desirable that the circuits involved be insensitive to decreases or fluctuations in power supply voltage caused by battery age, power on/off cycling, the resistance of interconnecting power leads, etc.

A conventional method for switching power to a circuit utilizes a switching device such as a series pass transistor; however, there are several disadvantages associated with such circuits. A series pass device, in the on state, has an associated voltage drop that subtracts from the available supply voltage. Such voltage drop is significant in low-voltage, battery operated apparatus.

Furthermore, the current must be consumed in the controlling element of a power switching device, e.g., the base current required to saturate a switching transistor is greater than the collector current divided by beta. In the case of a low-beta pnp switching device implemented in a typical bipolar integrated circuit process optimized for npn devices, the base current of the switching device can be a significant percentage of the total current, and this current is essentially wasted.

Another disadvantage of using a series switching devices is that the die area required for a switching device that carries the total chip current is significant.

A separate, off-chip switching transistor could be used to improve beta at the cost of an additional part and more board area. An npn switching device could be used to reduce the base current demand, but such a device would require a base voltage above the battery voltage for a low collector-emitter voltage $V_{CE}$ drop if the switching device were placed between the battery positive terminal and the load. It is noted that if a pass device were placed in the ground return path, its $V_{CE}$ drop could adversely affect ground-referenced signals.

The object of the present invention to provide an improved on-off switching circuit that maximizes battery life.

Another object of the present invention to eliminate the need for a series switching device and thereby eliminate the voltage drop normally associated with such a device.

Yet another object of the present invention is to provide an on-off switch for electronic circuitry which requires little or no power in the off state.

It is another object of the invention to provide an improved bias supply circuit for a system which has a short duty cycle followed by a relatively long power-off time.

Another object of the instant invention is to provide an improved microcircuit bias supply with on-off switching control that results in virtually zero current drain from the circuits during quiescent periods.

SUMMARY OF THE INVENTION

The present invention combines in a novel way an on-off switch and the current bias supply circuits for a number of functional circuits. With the present invention, a very small supply independent current source is switched by the external on-off signal. The switch which controls the small independent current source is configured so that the switch draws no current in the off state. The small independent current source in turn controls a temperature stable reference voltage source through a current mirror. The output of the reference voltage source controls a plurality of master current sources. These master current sources in turn control functional circuit current bias supplies through current mirrors. Thus when an "on" or "off" signal is received from an external source, (a) the small independent current source is switched "on" or "off" which in turn (b) switches the temperature stable reference source "on" or "off" which (c) switches the master current sources "on" or "off", which in turn (d) controls the functional circuit current bias supplies.

The major advantages of the present invention is that it draws no current in the "off" state and that it does not have a series switch with the associated voltage drop. The functional circuit current bias supply circuits are controlled from the voltage reference through current mirrors and hence they operate at a voltage which is relatively near ground potential. The entire supply voltage (except for the drop across the bias supply circuits) is available to the application circuits.

BRIEF DESCRIPTION OF THE DRAWING

While the invention is set forth with particularity in the appended claims, other objects, features, the organization and method of operation of the invention will become more apparent, and the invention will best be understood by referring to the following detailed description in conjunction with the accompanying drawing in which:

DESCRIPTION OF THE PREFERRED EMBODIMENTS

Figure 1:
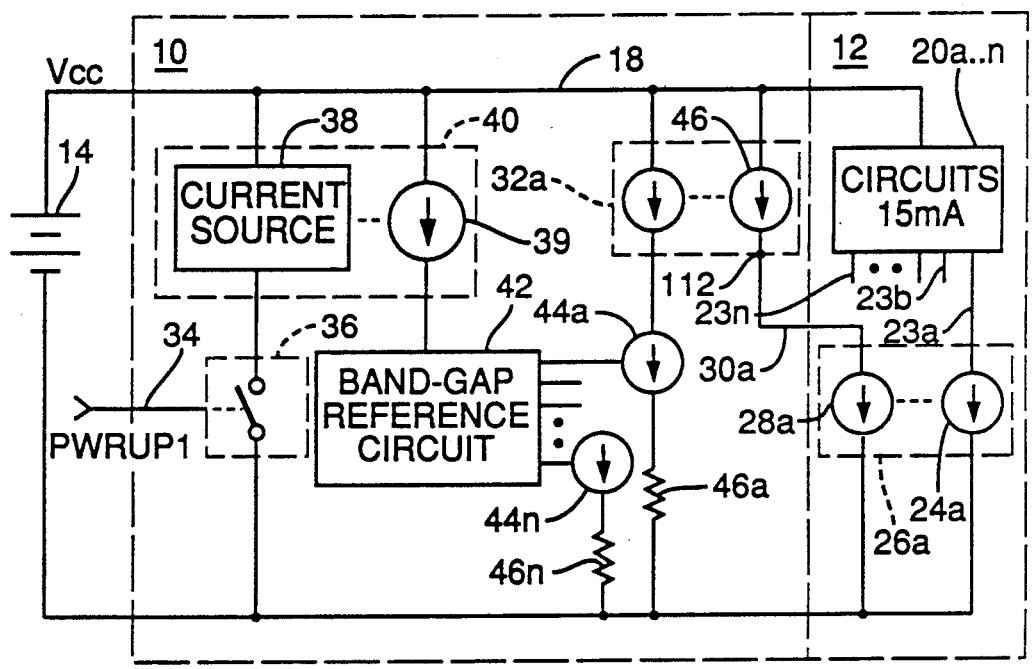
FIG. 1 is a schematic block diagram of a microcircuit bias-current supply and user circuits in accordance with the instant invention.

Referring now to the various views of the drawing for a more detailed description of the components, materials, construction, function, operation and other features of the instant invention by characters of reference, FIG. 1 shows a bias circuit 10 supplying bias current to a plurality of system functional circuits 12, which in the presently described embodiment of the invention comprise the bipolar integrated-circuit components of a miniature FM subcarrier receiver in a wristwatch-pager as described in the aforementioned patent to Gaskill et al. Operating voltage $V_{CC}$ is supplied to the bias circuit 10 and the system circuits 12 directly from a battery 14 on a bus 18; battery voltage is suitably 2.2 to 3.5 volts.

Figure 2:
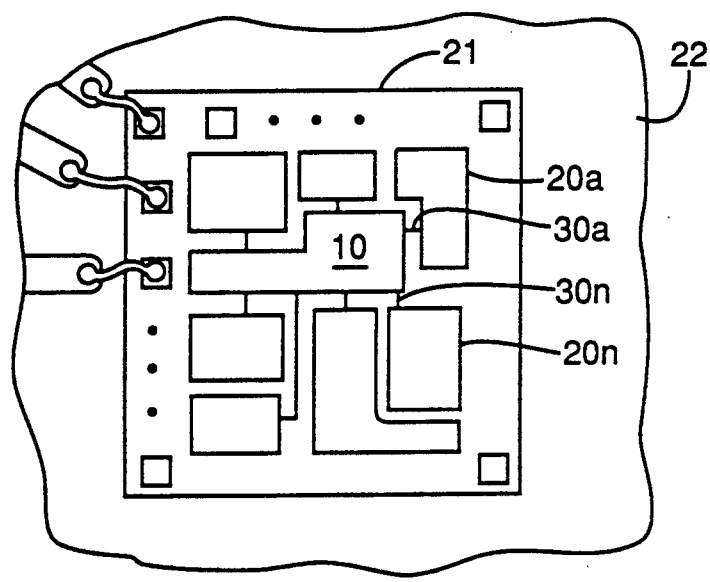
FIG. 2 is a schematic illustration of a microcircuit chip mounted on a watch-sized printed circuit board and incorporating the circuits of FIG. 1.

Referring to FIG. 2 in conjunction with FIG. 1, the system functional circuits 12 of FIG. 1 are shown as a plurality of functional circuit areas 20a ... n of an integrated circuit chip 21, which can for example be mounted on a printed circuit board (PCB) 22, the bias circuit 10 being located among the circuit areas 20a ... n to allow convenient distribution of bias currents. A functional circuit can be any circuit such as a logic gate, an amplifier or a bistable. A functional circuit area means a group of microcircuit elements that make up one or more functional circuits that perform a particular function and by design can be conveniently grouped together in a particular area of an integrated circuit die. A microcircuit element means an integrated-circuit component such as a resistor or a transistor; a microcircuit means at least one functional circuit on an integrated circuit die and formed from interconnected microcircuit elements. Such microcircuit elements could, for example, form a functional circuit area comprising an IF strip, an audio amplifier or a storage matrix. For simplicity, only representative portions of the PCB 22 and the interconnecting conductors are shown.

Transistor current sources are commonly used in analog integrated circuits as biasing elements, which results in reduced sensitivity of circuit performance to power-supply variations and to temperature. Further, current sources often utilize less die area than resistors to provide the desired bias current, particularly when the required value of bias current is small. As indicated in FIG. 1, when power is enabled in the presently described embodiment of the invention, the system circuits 12 collectively require about 15 milliamps of current. Each of the circuit areas 20a ... n is connected internally of the area by a lead 23a ... n to a current source 24a ... n, one of which is illustrated symbolically in FIG. 1 as one element 24a of a current-mirror circuit 26a. Corresponding current-mirror circuits (not shown) such as the circuit 26a are provided in each of the plurality of circuit areas 20a ... n. The current source 24a mirrors a second current source 28a of the current-mirror circuit 26a, as described in more detail below. Each of the current-mirror circuits 26a ... n in the various circuit areas 20a ... n is connected by a lead 30a ... n to a corresponding current mirror circuit 32a ... n in the bias circuit 10.

Power is applied to the system circuits by way of a power-enable control signal PWRUP1 on a lead 34 from a microprocessor (not shown) that controls system power. The PWRUP1 signal is a CMOS digital logic level, which controls a switch circuit 36 in the ground return of a supply-independent current source 38. A supply-independent current source is one in which the bias currents of the circuit are dependent on a voltage standard other than the supply voltage, for example a Zener diode or the base-emitter voltage $V_{BE}$ of a transistor. In the instant embodiment, the best-mode supply-independent current source is a bootstrap or self-biased current source 38, which develops a current that is made to depend directly on the output of the current source itself, thereby establishing a reference current that is relatively independent of power supply voltage. The current developed in the bootstrap current source 38 is mirrored in another current source 39, the current sources 38, 39 together forming a current-mirror circuit 40, the output of which is supplied to a band-gap reference circuit 42. The band-gap circuit 42 develops a temperature-stable reference voltage of 1.21 volts, which is distributed to a plurality of master current sources 44a ... n in the bias circuit 10. Each of the master current sources 44a ... n includes an on-chip current-setting resistor 46a ... n, and is coupled to a corresponding one of the current-mirror circuits 32a ... n.

Referring momentarily to FIG. 2, the bias circuit 10 is centrally located among the other functional circuit areas 20a ... n, and while the band-gap voltage could be distributed to the circuits 20a ... n, it would be susceptible to voltage drops from resistance in leads, noise, etc. However, when currents of predetermined magnitude for each of the functional microcircuit areas 20a ... n are distributed throughout the system, the importance of voltage drops is muted. Current sources 32a ... n have a high-impedance output, and resistance in the lines 30a ... n does not affect the magnitude of the currents. At the various points of use throughout the device, the current is again mirrored, in each instance in one of the current mirror circuits 26a ... n. Although the bias currents are remotely re-mirrored in the functional circuit areas, it is seen that a bias current could be supplied directly to a functional circuit locally from the bias supply 10, for example by the current source 46.

Figure 3:
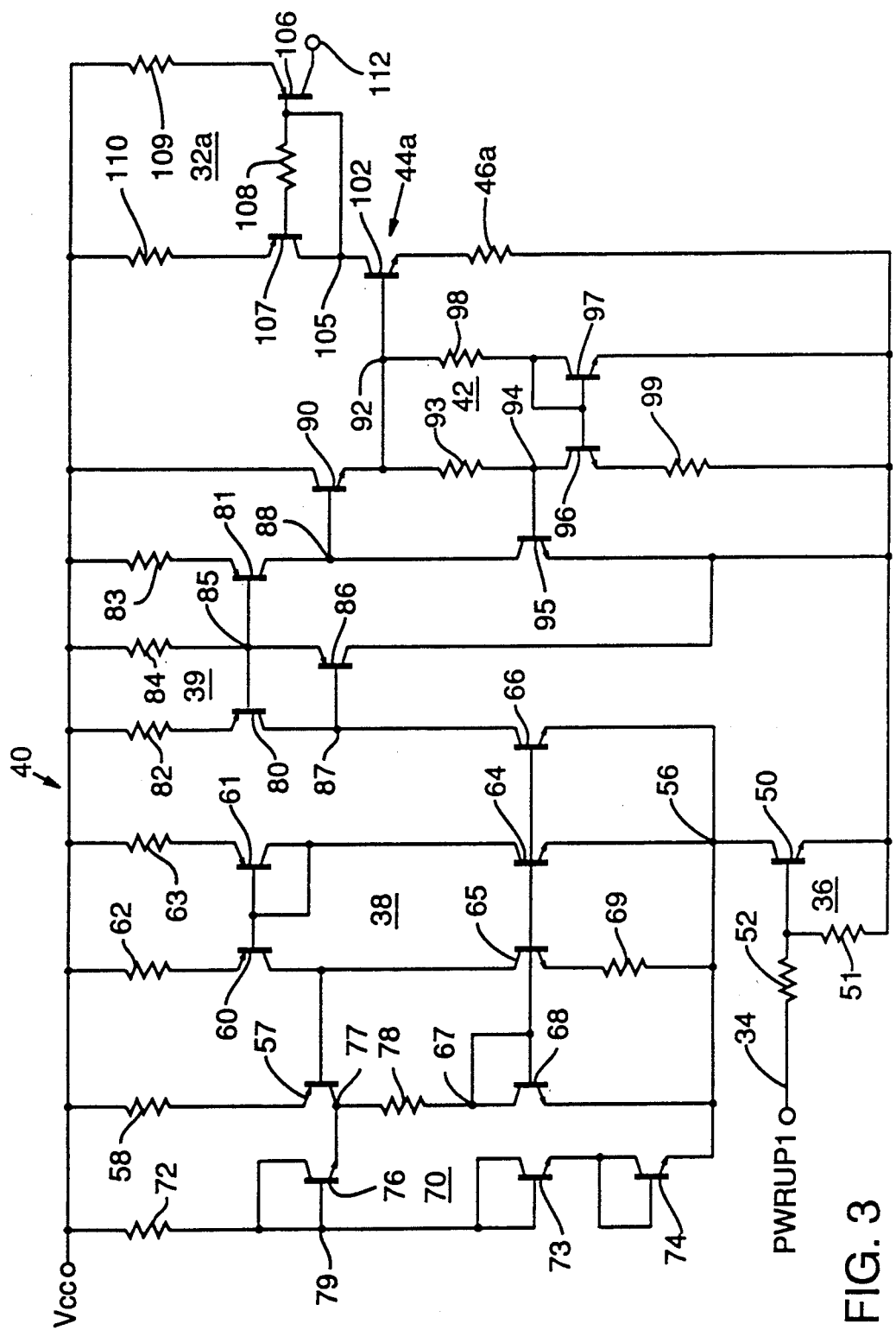
FIG. 3 is a schematic diagram of the bias-current supply circuits of FIG. 1.

Referring to FIG. 3, a detailed schematic diagram shows the circuits of FIG. 1, which are implemented in a bipolar integrated circuit. The switch circuit 36 comprises a substrate-contact diffusion transistor 50 which has good saturation characteristics. Transistor 50 has its base connected through a 100K resistor 51 to ground, and through another 100K resistor 52 to the PWRUP1 signal input lead 34. The transistor 50, when enabled by the PWRUP1 signal, provides a ground return for the bootstrap current source circuit 38 at a node 56.

The bootstrap current source 38 comprises a first lateral pnp (LPNP) transistor 57 having its emitter connected through a 1K resistor 58 to the supply voltage $V_{CC}$, a second LPNP transistor 60 and a diode-connected LPNP transistor 61, each of the latter having an emitter connected through a corresponding 2K resistor 62, 63 to the supply voltage $V_{CC}$. The bases of the transistors 60, 61 are common, and the collector of transistor 60 is connected to the collector of transistor 65 and the base of transistor 57. An npn transistor 64 has its collector connected to the base-collector junction of the diode 61, and its emitter connected to the node 56. The base of transistor 64 is common with the bases of npn transistors 65, 66, and with a node 67 at the base-emitter junction of a diode-connected npn transistor 68.

The emitter of transistor 65 is connected through a 650 ohm resistor 69 to the node 56, and the emitters of the transistor 66 and the diode-connected transistor 68 are connected directly to the node 56.

A startup circuit 70 comprises a 100K resistor 72 connected in series with two diode-connected transistors 73, 74 to ground node 56, and a diode-connected transistor 76 having its emitter connected to a node 77 between the collector of transistor 57 and a 15K resistor 78, which is connected at its other end to the node 67. The collector-base junction of the diode 76 is connected to a node 79 between the resistor 72 and the diode 73.

The bootstrap current source circuit 38 has the potential of operating at two stable states, one in which there is zero current flowing in the circuit, and the other in which equal currents flow through the two branches of the circuit. The startup circuit 70 serves to avoid the zero-current state by insuring that some current always flows in the transistors of the circuit 38, and the current gain does not fall to a very low value. If the circuit 38 were near the zero-current state, the voltage at the base of transistor 65 would be at or near ground, and the voltage at the node 67 would be slightly above ground as determined by leakage currents of the circuit. The voltage at node 79 is two diode drops above ground, therefore a voltage equal to about one diode drop would appear across the resistor 78 through which a current would flow into the transistors 64–66, which in turn would cause current to flow in transistors 57, 60, 61, thereby avoiding the zero-current state. As the circuit 38 drives toward the desired stable state, the voltage drop across the resistor 78 becomes large enough to reverse bias the diode 6.

The current source 39 comprises two LPNP transistors 80, 81, having their emitters connected, respectively, through a 2K resistor 82 and a 1K resistor 83 to the supply voltage $V_{CC}$. A 100K resistor 84 is connected from $V_{CC}$ to a node 85 between the bases of the transistors 80, 81, a third LPNP transistor 86 having its emitter connected to the node 85. The collector of transistor 86 is grounded, and its base is connected to the collector of transistor 80 at a node 87, which is connected to the collector of transistor 66 in the bootstrap current source 38. The collector of transistor 81 is connected to an output node 88. The supply-independent reference current developed in the current source 38 and flowing in the transistor 66 is mirrored in the transistor 81 and is injected into the node 88 at the input of the band-gap reference circuit 42.

The band-gap circuit develops a temperature-independent reference voltage from the supply-independent current source 39. Details of the operation of the band-gap circuit as well as other individual circuits such as the current sources and current mirror circuits disclosed herein are well known and are not described herein. See, for example, P. R. Gray and R. G. Meyer, Analysis and Design of Analog Integrated Circuits, Wiley, New York, 1984. The band-gap reference circuit 42 comprises an npn transistor 90 having its base connected to the node 88, its collector connected to the supply voltage $V_{CC}$ and its emitter connected to an output node 92 of the circuit 42. The node 92 is connected through a 12K resistor 93 to a node 94 connecting the base of an npn transistor 95 with the collector of an npn transistor 96. The base of transistor 96 is connected to the base-collector junction of a diode-connected transistor 97, which is connected in series with a 5K resistor 98 between the output node 92 and ground. The emitter of transistor 95 is connected to ground, and the emitter of transistor 96 is connected through a 1.48K resistor 99 to ground.

Referring to FIG. 3 in conjunction with FIG. 1, a representative one 44a of the band-gap referenced master current sources 44a ... n and the corresponding current-mirror circuit 32a comprise an npn transistor 102 having its base connected to the output node 92 of the band-gap reference circuit 42. The emitter of the transistor 102 is connected through the current-setting resistor 46a to ground, the resistor 46a having a value of 8.4K in the instant representative circuit. The collector of transistor 102 is connected to a node 105 of the current mirror circuit 32a, which in turn is connected to the base of an LPNP resistor 106, the collector of an LPNP resistor 107 and through a 2K resistor 108 to the base of transistor 107. The emitters of the transistors 106, 107 are connected, respectively, through 1K resistors 109, 110 to the supply voltage $V_{CC}$. The collector of transistor 106 is connected to an output node 112, which can for example supply 50 microamps current by way of the lead 30a to the corresponding current source 28a of current mirror circuit 26a. The current developed in the band-gap referenced master current source 44a, in this instance 50 microamps, is mirrored in the transistor 106 current source and supplied to the functional circuit group 20a (see FIG. 2) of the microcircuit chip 21 by way of the bus 30a. The bias current requirement of each of the functional circuit groups 20a ... n is predetermined by design and the appropriate value of current provided in the design of the corresponding master current source 44a by way of the current mirror circuits 32a ... n. The currents are individually determined in the bias supply circuit 10, which is essentially centrally located on the microcircuit chip, and derived from a supply-independent current source that is referenced to a temperature-independent voltage. The individual bias currents being distributed to the functional circuit areas throughout the chip further makes the circuits less sensitive to supply voltage variations due to line losses.

Multiple current sources 44a ... n, which are connected to and enabled by the band-gap voltage, produce biasing currents determined by the band-gap voltage and the resistors 46a ... n. The current-setting resistors 46a ... n are each chosen to match the type of resistor used in the corresponding one of the functional circuit areas 20a ... n providing nominally constant gain and voltage drops versus resistor tolerance. These biasing currents are mirrored by current mirrors 32a ... n and distributed to the various functional circuits around the die for use as local reference currents in current mirror circuits 26a ... n local to the individual circuits.

When the power enable control signal PWRUP1 falls low, base drive is removed from the transistor 50 of the switch circuit 36 and its collector voltage floats up to $V_{CC}$, which disables the reference current source 38 and shuts off drive current to the band-gap voltage source 42. The band-gap voltage then falls to ground turning off the various master current sources 44a ... n and current mirrors 32a ... n, 26a ... n, which removes bias current to the functional circuit areas 20a ... n and shuts off the system circuits 12.

Figure 4:
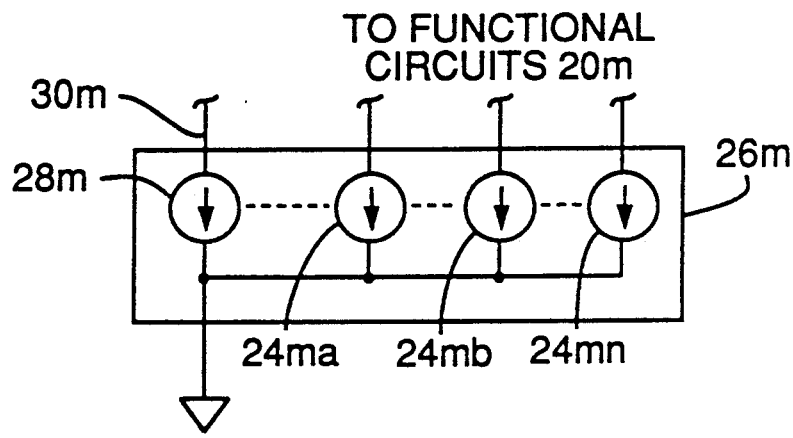
FIG. 4 shows an alternative embodiment of the remote current mirror circuit 26a of FIG. 1.

Referring to FIG. 4 in conjunction with FIG. 1, while the remote current mirror circuit 26a is shown in FIG. 1 as having two elements, viz.: the local-reference current source 28a and the current mirror element 24a, it is understood that a remote current mirror 26m can include two or more current mirror elements 24ma ...

mn, each of which mirrors the local reference current developed in the current source 28m, by developing either a true mirror of the reference current or a scaled current proportional to the reference current, the magnitude of the scaled currents being depending on the size of the current mirror 24ma ... mn transistors relative to the size of the current source 28m transistor.

All of the system circuits 12 are connected to the supply voltage $V_{CC}$, therefore leakage currents will still flow when the bias supply 10 is turned off by the switch circuit 36 as described above; if there are any significant leakage paths in any the transistors of the system circuits, which can number in the high hundreds, battery degradation could occur at a faster rate than is desirable. However, the process utilized to form the circuits of the bias supply 10 and the system circuits 20a ... n is the oxide-isolation process, which isolates the collectors of the transistors from each other with trenches etched into the epitaxial layer, the trenches being lined with silicon dioxide and filled with polycrystalline silicon, the process yielding circuits with very low leakage current. Consequently, when the desired bias currents are shut off by disabling the PWRUP1 signal, the leakage current, from all 700 to 800 transistors in the system, is very low--on the order of nanoamps. Circuits built with conventional junction isolation processes would also benefit from this technique; however, the magnitude of the off current would not be as low.

Figure 5:
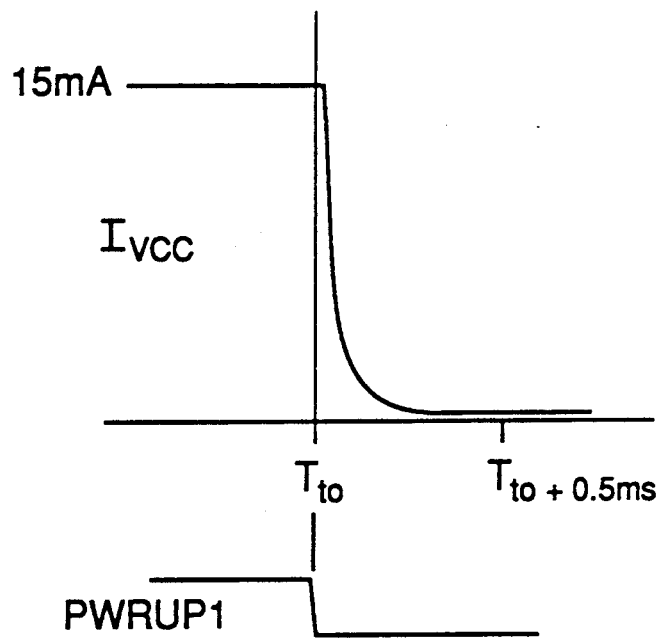
FIG. 5 is a timing diagram of bias current shut-off in accordance with the present invention.

Referring to the FIG. 5 timing diagram, it is seen that system current $IV_{CC}$, from system turn-off time $T_{to}$ when the PWRUP1 signal is disabled, decays from 15 ma to essentially zero current, less than 100 nanoamps, within 300 microseconds. Naturally, the exact figures are circuit dependent and the invention will operate in other environments.

In summary one embodiment of the invention provides a microcircuit bias supply capable of an intermittent duty-cycle under external control. The bias supply generates circuit bias derived from a current source referenced to a voltage-reference circuit, which in turn is provided with operating current from a reference current source circuit coupled to an on/off circuit that disables the reference current source, which switches off the bias current to the microcircuits, whereby only leakage current flows during quiescent periods. The microcircuits can for example be implemented in oxide-isolated bipolar integrated circuits.

A second embodiment of the invention provides, a microcircuit bias supply capable of an intermittent duty-cycle under external control generates circuit bias mirrored from a reference current source, and supplies the bias current to a functional circuit on the chip. The current is mirrored in the functional circuit and distributed therein. A switch circuit disables the reference current source during power-off portions of the microcircuit duty cycle, which switches off the bias current to the microcircuits, whereby only leakage current flows during quiescent periods.

An important aspect of the present invention is that the functional circuit current bias supply circuits are controlled from the voltage reference through current mirrors and hence they operate at a voltage which is relatively near ground potential. The entire supply voltage (except for the drop across the bias supply circuits) is available to the application circuits. The current bias circuits are required for bias purposes regardless of what type of turn off circuitry is used, hence, the voltage drop across the bias circuit is not a penalty incurred by the use of the turn off circuit of the present invention.

While the principles of the invention have now been made clear in the foregoing illustrative embodiment, there will be immediately obvious to those skilled in the art many modifications of structure, arrangement, proportions, the elements, material and components used in the practice of the invention, and otherwise, which are particularly adapted for specific environments and operating requirements without departing from those principles. The appended claims are, therefore, intended to cover and embrace any such modifications, within the limits only of the true spirit and scope of the invention.

We claim:

1. A microcircuit having a plurality of microcircuit elements, and comprising:
    a voltage source terminal for supplying operating voltage to the microcircuit;
    a functional circuit connected to the voltage source terminal;
    means connected to the voltage source terminal for generating a bias current for operating the functional circuit; and
    means for selectively disabling and enabling the bias current generating means thereby controlling the bias current to the functional circuit, whereby power dissipation in the microcircuit can be limited to leakage currents of the plurality of microcircuit elements by disabling the bias current and the functional circuit can be repetitively operated by repetitively enabling the bias current.

2. The microcircuit of claim 1 wherein the bias current generating means comprises:
    a current source connected to the voltage source terminal for generating a reference current;
    a current mirror circuit coupled to the functional circuit and coupled to the current source, the current mirror circuit generating the bias current as a function of the reference current.

3. The microcircuit of claim 1 wherein the bias current generating means comprises:
    a first current source connected to the voltage source terminal for generating a reference current;
    a reference-voltage circuit receiving the reference current and generating a reference voltage;
    a second current source coupled to the functional circuit, the second current source generating the bias current as a function of the reference voltage.

4. The microcircuit of claim 3 wherein the first current source comprises a self-biased current source.

5. The microcircuit of claim 3 wherein the reference-voltage circuit comprises a band-gap reference voltage generator circuit.

6. The microcircuit of claim 3 wherein the disabling means comprises a transistor switch supplying a ground return for the first current source and adapted for receiving a power on/off control signal from an external source.

7. The microcircuit of claim 3 wherein the disabling means comprises a transistor switch supplying a ground return for only the first current source and adapted for receiving a power on/off control signal from an external source.

8. A microcircuit having a plurality of microcircuit elements and comprising:
    a source of voltage supplying operating voltage to the microcircuit;

a functional circuit connected to the voltage source; and a bias-current circuit including a first current source connected to the voltage source and generating a reference current;

a reference-voltage circuit receiving the reference current and generating a reference voltage corresponding thereto;

a second current source coupled to the functional circuit, the second current source generating a predetermined magnitude of bias current as a function of the reference voltage and suitable for operating the functional circuit; and means controllably coupled to the first current source for switching the bias-current circuit to a quiescent state thereby disabling the functional circuit, whereby power dissipation in the microcircuit is limited to leakage currents of the microcircuit elements.

9. The microcircuit of claim 8 wherein the switching means, when enabled, supplies a return for the first current source, and when disabled, opens the return thereby disabling the first current source.

10. The microcircuit of claim 8 wherein the switch means comprises a transistor receiving a power on/off control signal from an external source.

11. The microcircuit of claim 8 wherein the microcircuit elements are implemented in oxide-isolated bipolar integrated circuits.

12. The microcircuit of claim 8, further comprising a third current source connected to the voltage source and coupled between the first current source and the reference-voltage circuit, the third current source generating a mirror of the reference current.

13. A microcircuit having a plurality of microcircuit elements and comprising:

a source of voltage supplying operating voltage to the microcircuit;

a plurality of functional circuits connected to the voltage source, each including a current mirror circuit;

a bias-current circuit including a first current source connected to the voltage source and generating a reference current;

a reference-voltage circuit receiving the reference current and generating a reference voltage in response thereto;

a plurality of second current sources each corresponding to one of the plurality of functional circuits, each of the plurality of second current sources generating a bias current of predetermined magnitude as a function of the reference voltage and suitable for operating the corresponding one of the plurality of functional circuits;

a plurality of second current-mirror circuits, each connected to a corresponding one of the current-mirror circuits in the plurality of functional circuits, each of the predetermined bias currents of the second current sources determining the magnitude of current provided by the corresponding second current-mirror circuit of the bias-current circuit and in turn the magnitude of current provided by the current-mirror circuit of the corresponding functional circuit; and means controllably coupled to said first current source for switching the bias-current circuit to a quiescent state thereby disabling the plurality of functional circuits, whereby power dissipation in the microcircuit is limited to leakage currents of the microcircuit elements.

14. The microcircuit of claim 13 wherein the switching means, when enabled, supplies a return for the first current source, and when disabled, opens the return thereby disabling the first current source.

15. The microcircuit of claim 14 wherein the switching means comprises a transistor receiving a power on/off control signal from an external source.

16. The microcircuit of claim 13 wherein the microcircuit elements are implemented in oxide-isolated bipolar integrated circuits.

17. The microcircuit of claim 13, further comprising a third current source connected to the voltage source and coupled between the first current source and the reference-voltage circuit, the third current source generating a mirror of the reference current.

18. A microcircuit having a plurality of microcircuit elements implemented in oxide-isolated bipolar integrated circuits, and comprising:

a voltage source terminal for supplying operating voltage to the microcircuit;

a functional circuit connected to the voltage source terminal;

a bias-current circuit including a first self-biased current source connected to the voltage source terminal and generating a first reference current;

a band-gap reference-voltage circuit receiving the first reference current and generating a reference voltage;

a second current source coupled to the functional circuit, the second current source generating a predetermined magnitude of bias current as a function of the reference voltage and suitable for operating the functional circuit; and a transistor switch adapted for receiving a power on-off control signal from an external source and supplying a return path for the self-biased current source when in an on state, the self-biased current source being disabled when the switch is in an off state thereby disabling the functional circuit, whereby power dissipation in the microcircuit is limited to leakage currents of the plurality of microcircuit elements.

* * * * *